(12) United States Patent
König et al.

(10) Patent No.: US 8,629,206 B2
(45) Date of Patent: Jan. 14, 2014

(54) FLAME-RETARDANT THERMOPLASTIC MOLDING COMPOSITION

(75) Inventors: Alexander König, Bruchsal (DE); Siqi Xue, Shanghai (CN); Klaus Uske, Bad Dürkheim (DE); Michael Roth, Lautertal (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/352,535

(22) Filed: Jan. 18, 2012

(65) Prior Publication Data

US 2012/0190781 A1 Jul. 26, 2012

Related U.S. Application Data

(60) Provisional application No. 61/434,444, filed on Jan. 20, 2011.

(51) Int. Cl.
*C08K 5/5399* (2006.01)

(52) U.S. Cl.
USPC .......................... 524/138; 524/414; 524/494

(58) Field of Classification Search
USPC ................................................ 524/138, 414
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,393,210 A | 7/1968 | Speck | |
| 4,148,846 A | 4/1979 | Owens et al. | |
| 4,360,617 A | 11/1982 | Muller et al. | |
| 4,396,742 A | 8/1983 | Binsack et al. | |
| 4,537,949 A | 8/1985 | Schmidt et al. | |
| 4,540,772 A | 9/1985 | Pipper et al. | |
| 4,628,069 A | 12/1986 | Meyer et al. | |
| 4,745,146 A | 5/1988 | Meyer et al. | |
| 4,771,109 A | 9/1988 | Eichenauer et al. | |
| 4,873,289 A | 10/1989 | Lindner et al. | |
| 4,882,381 A | 11/1989 | Wittmann et al. | |
| 5,010,135 A | 4/1991 | Eckel et al. | |
| 5,049,599 A | 9/1991 | Steiert et al. | |
| 5,081,222 A | 1/1992 | Reimann et al. | |
| 6,084,012 A | 7/2000 | Gareiss et al. | |
| 6,194,538 B1 | 2/2001 | Weiss et al. | |
| 6,699,960 B1 | 3/2004 | Ohlbach et al. | |
| 2002/0198295 A1* | 12/2002 | Urabe et al. ................. | 524/116 |
| 2003/0096946 A1 | 5/2003 | Heinen | |
| 2004/0266916 A1* | 12/2004 | Harashina et al. ............ | 523/217 |
| 2005/0004292 A1* | 1/2005 | Harashina et al. ............ | 524/430 |
| 2006/0235191 A1 | 10/2006 | Deininger et al. | |
| 2008/0255279 A1 | 10/2008 | Neuhaus et al. | |
| 2009/0012229 A1 | 1/2009 | Desbois et al. | |
| 2009/0300946 A1 | 12/2009 | Egbers et al. | |
| 2010/0069539 A1* | 3/2010 | Morimoto et al. ............ | 524/100 |
| 2010/0090174 A1 | 4/2010 | Weber et al. | |
| 2010/0192814 A1 | 8/2010 | Herzog et al. | |
| 2010/0261818 A1 | 10/2010 | Seki | |

FOREIGN PATENT DOCUMENTS

| | | |
|---|---|---|
| CA | 1284016 C | 5/1991 |
| CN | 101434727 A | 5/2009 |
| CN | 101445650 A | 6/2009 |
| DE | 2702661 | 8/1977 |
| DE | 2702661 A1 | 8/1977 |
| DE | 27 03 052 A1 | 7/1978 |
| DE | 37 25 576 A1 | 2/1989 |
| DE | 38 00 603 A1 | 7/1989 |
| DE | 41 20 661 A1 | 12/1992 |
| DE | 44 13 177 A1 | 10/1995 |
| DE | 4413177 A1 | 10/1995 |
| DE | 196 48 503 A1 | 5/1998 |
| DE | 10313681 A1 | 10/2004 |
| DE | 10 2006 045 869 A1 | 4/2008 |
| EP | 38 094 A2 | 10/1981 |
| EP | 38 582 A2 | 10/1981 |
| EP | 0038094 A2 | 10/1981 |
| EP | 0038582 A2 | 10/1981 |
| EP | 39 524 A1 | 11/1981 |
| EP | 0039524 A1 | 11/1981 |
| EP | 0 050 265 A1 | 4/1982 |
| EP | 50265 A1 | 4/1982 |

(Continued)

OTHER PUBLICATIONS

U.S. Appl. No. 61/420,797.

(Continued)

*Primary Examiner* — Peter Szekely
(74) *Attorney, Agent, or Firm* — Novak Druce Connolly Bove + Quigg LLP

(57) ABSTRACT

The thermoplastic molding composition comprises
  a) from 30 to 95% by weight of at least one aliphatic polyamide or copolyamide, as component A,
  b) from 1 to 30% by weight of at least one cyclic phenoxyphosphazene having at least 3 phenoxyphosphazene units, as component B,
  c) from 1 to 15% by weight of red phosphorus, as component C,
  d) from 0.1 to 20% by weight of at least one impact-modifying polymer, as component D,
  e) from 0 to 50% by weight of glass fibers, as component E, and
  f) from 0 to 30% by weight of further additives, as component F, where the total amount of components A to F gives 100% by weight.

20 Claims, No Drawings

(56) References Cited

FOREIGN PATENT DOCUMENTS

| | | | |
|---|---|---|---|
| EP | 071 788 A1 | 2/1983 |
| EP | 112 542 A2 | 7/1984 |
| EP | 129195 A2 | 12/1984 |
| EP | 129196 A2 | 12/1984 |
| EP | 176 836 A2 | 4/1986 |
| EP | 0208187 A2 | 1/1987 |
| EP | 224 847 A2 | 6/1987 |
| EP | 235 690 A2 | 9/1987 |
| EP | 235690 A2 | 9/1987 |
| EP | 240 887 A2 | 10/1987 |
| EP | 299444 A2 | 1/1989 |
| EP | 0319290 A2 | 6/1989 |
| EP | 384 232 A1 | 8/1990 |
| EP | 922065 A2 | 6/1999 |
| EP | 1198491 A1 | 4/2002 |
| EP | 1252168 A1 | 10/2002 |
| EP | 1626066 A1 | 2/2006 |
| EP | 1984438 A1 | 10/2008 |
| EP | 1994075 A2 | 11/2008 |
| EP | 2 100 919 A1 | 9/2009 |
| EP | 2100919 A1 | 9/2009 |
| EP | 2223904 A2 | 9/2010 |
| GB | 1592813 A | 7/1981 |
| JP | 11335531 A | 12/1999 |
| JP | 11335534 A | 12/1999 |
| JP | 11335535 A | 12/1999 |
| JP | 2009 155436 A | 7/2009 |
| KR | 1020070117410 | 12/2007 |
| WO | WO-96/16948 A1 | 6/1996 |
| WO | WO-02/96976 A1 | 12/2002 |
| WO | WO-2005121249 A1 | 12/2005 |
| WO | WO-2007042446 A1 | 4/2007 |
| WO | WO-2008074687 A2 | 6/2008 |
| WO | WO-2011003773 A1 | 1/2011 |
| WO | WO-2011051121 A1 | 5/2011 |

OTHER PUBLICATIONS

U.S. Appl. No. 61/423,614.
U.S. Appl. No. 61/370,473.
U.S. Appl. No. 13/193,886.
International Search Report for PCT/EP2012/050780.
U.S. Appl. No. 13/446,069, filed Apr. 13, 2012.
U.S. Appl. No. 13/457,661, filed Apr. 27, 2012.
U.S. Appl. No. 13/466,428, filed May 8, 2012.

\* cited by examiner

FLAME-RETARDANT THERMOPLASTIC MOLDING COMPOSITION

CROSS-REFERENCE TO RELATED APPLICATIONS

This application claims benefit (under 35 USC 119(e)) of U.S. Provisional Application 61/434,444, filed Jan. 20, 2011, which is incorporated by reference.

BACKGROUND OF THE INVENTION

The invention relates to a flame-retardant thermoplastic molding composition based on aliphatic polyamides, to processes for producing the same, and to use of the same for producing moldings, fibers, or foils, also to moldings, fibers, or foils produced therefrom.

The prior art discloses the use of cyclic phenoxyphosphazenes in flame-retardant polyamide resin compositions. EP-A-2 100 919 relates to flame-retardant polyamide resins which comprise, alongside a polyamide resin, a flame-retardant substance comprising phosphorus, and glass fibers. The phosphorus-containing substance can be one selected from reaction products of melamine with phosphoric acid, from (di)phosphinate salts, and also phosphazene compounds, in particular from cyclic phenoxyphosphazene compounds.

US-A-2010/0261818 relates to halogen-free, flame-retardant polyamide compositions which can be used in electrical applications. The polyamide resins comprise a phosphinate, a phosphazene, and optionally a flame-retardant synergistic compound selected from specific oxides. Phenoxyphosphazenes are examples of cyclic phosphazenes that can be used.

The flame-retardant effect of the previously known flame-retardant polyamide compositions is not yet adequate for all applications. In particular, some of the flame times are still too long.

A SUMMARY OF THE INVENTION

It is an object of the present invention to provide flame-retardant thermoplastic molding compositions which comprise polyamides and which, when compared with previously known molding compositions, exhibit reduced flame times and are classified as providing good fire protection.

The invention achieves the object via a thermoplastic molding composition comprising
  a) from 30 to 95% by weight of at least one aliphatic polyamide or copolyamide, as component A,
  b) from 1 to 30% by weight of at least one cyclic phenoxyphosphazene having at least 3 phenoxyphosphazene units, as component B,
  c) from 1 to 15% by weight of red phosphorus, as component C,
  d) from 0.1 to 20% by weight of at least one impact-modifying polymer, as component D,
  e) from 0 to 50% by weight of glass fibers, as component E, and
  f) from 0 to 30% by weight of further additives, as component F, where the total amount of components A to F gives 100% by weight.

It has been found in the invention that the combination of cyclic phenoxyphosphazenes with red phosphorus gives reduced flame times but does not alter fire-protection classification. Use of a combination of the red phosphorus here with cyclic phenoxy-phosphazenes can markedly improve the flame-retardant effect of the polyamide compositions.

A DETAILED DESCRIPTION OF THE INVENTION

The individual components of the thermoplastic molding composition are described below.

Component A

From 30 to 95% by weight, preferably from 45 to 84.5% by weight, in particular from 55 to 69.5% by weight, of at least one aliphatic polyamide or copolyamide are used as component A. In one embodiment of the invention, the minimum amount can be 59.5% by weight.

The polyamides used in the invention are produced via reaction of starting monomers selected by way of example from dicarboxylic acids and from diamines or from salts of the dicarboxylic acids and diamines, from aminocarboxylic acids, from aminonitriles, from lactams, and from mixtures thereof. Starting monomers of any desired aliphatic polyamides can be involved here. The polyamides can be amorphous, crystalline, or semicrystalline. The polyamides can moreover have any desired suitable viscosities and, respectively, molecular weights. Particularly suitable polyamides have aliphatic, semicrystalline, or semiaromatic, or else amorphous, structure of any type.

The intrinsic viscosity of these polyamides is generally from 90 to 350 ml/g, preferably from 110 to 240 ml/g, determined in a 0.5% by weight solution in 96% by weight sulfuric acid at 25° C. to ISO 307.

Semicrystalline or amorphous resins with molecular weight (weight average) of at least 5000 are preferred, these being described by way of example in the following U.S. Pat. Nos. 2,071,250, 2,071,251, 2,130,523, 2,130,948, 2,241,322, 2,312,966, 2,512,606 and 3,393,210. Examples of these are polyamides which derive from lactams having from 7 to 11 ring members, e.g. polycaprolactam and polycapryllactam, and also polyamides which are obtained via reaction of dicarboxylic acids with diamines.

Dicarboxylic acids that can be used are alkanedicarboxylic acids having from 6 to 12, in particular from 6 to 10, carbon atoms, and aromatic dicarboxylic acids. Mention may be made here of the following acids: adipic acid, azelaic acid, sebacic acid, and dodecanedioic acid (=decanedicarboxylic acid).

Particularly suitable diamines are alkanediamines having from 2 to 12, in particular from 6 to 8, carbon atoms, and also di(4-aminocyclohexyl)methane or 2,2-di(4-amino-cyclohexyl)propane.

Preferred polyamides are polyhexamethyleneadipamide (PA 66) and polyhexa-methylenesebacamide (PA 610), polycaprolactam (PA 6), and also nylon-6/6,6copolyamides, in particular having a proportion of from 5 to 95% by weight of caprolactam units. Particular preference is given to PA 6, PA 66, and nylon-6/6,6copolyamides.

Mention may also be made of polyamides which are obtainable by way of example via condensation of 1,4-diaminobutane with adipic acid at an elevated temperature (nylon-4,6). Production processes for polyamides having this structure are described by way of example in EP-A 38 094, EP-A 38 582, and EP-A 39 524.

Other examples are polyamides which are obtainable via copolymerization of two or more of the abovementioned monomers, and mixtures of a plurality of polyamides, in any desired mixing ratio.

The following non-exhaustive list comprises the polyamides mentioned, and also other polyamides for the purposes of the invention (the monomers being stated between parentheses):
PA 26 (ethylenediamine, adipic acid)
PA 210 (ethylenediamine, sebacic acid)
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA 4 (pyrrolidone)
PA 6 (ε-caprolactam)
PA 7 (ethanolactam)
PA 8 (capryllactam)
PA 9 (9-aminononanoic acid)
PA11 (11-aminoundecanoic acid)
PA12 (laurolactam)

These polyamides and production thereof are known. Details concerning their production are found by the person skilled in the art in Ullmanns Enzyklopädie der Technischen Chemie [Ullmann's Encyclopedia of Industrial Chemistry], 4th edition, vol. 19, pp. 39-54, Verlag Chemie, Weinmann 1980, and also Ullmann's Encyclopedia of Industrial Chemistry, vol. A21, pp. 179-206, VCH Verlag, Weinheim 1992, and also Stoeckhert, Kunststofflexikon [Plastics Encyclopedia], pp. 425-428, Hanser Verlag, Munich 1992 (keyword "Polyamide" [Polyamides] ff.).

It is particularly preferable to use nylon-6 or nylon-6,6.

It is moreover possible in the invention to provide functionalizing compounds in the polyamides, where these are capable of linkage to carboxy or amino groups and by way of example have at least one carboxy, hydroxy, or amino group. These are preferably monomers having branching effect, where these by way of example have at least three carboxy or amino groups,
monomers capable of linkage to carboxy or amino groups, e.g. via epoxy, hydroxy, isocyanato, amino, and/or carboxy groups, and which have functional groups selected from hydroxy groups, ether groups, ester groups, amide groups, imine groups, imide groups, halogen groups, cyano groups, and nitro groups, C—C double bonds, or C—C triple bonds,
or polymer blocks capable of linkage to carboxy or amino groups.

Use of the functionalizing compounds can adjust the property profile of the resultant polyamides as desired within a wide range.

By way of example, triacetonediamine compounds can be used as functionalizing monomers. These preferably involve 4-amino-2,2,6,6-tetramethylpiperidine or 4-amino-1-alkyl-2,2,6,6-tetramethylpiperidine, where the alkyl group in these has from 1 to 18 carbon atoms or has been replaced by a benzyl group. The amount present of the triacetonediamine compound is preferably from 0.03 to 0.8 mol %, particularly preferably from 0.06 to 0.4 mol %, based in each case on 1 mole of amide groups of the polyamide. Reference can be made to DE-A-44 13 177 for further details.

It is also possible to use, as further functionalizing monomers, the compounds usually used as regulators, examples being monocarboxylic acids and dicarboxylic acids. Reference can likewise be made to DE-A-44 13 177 for details.

Component B
From 1 to 30% by weight, preferably from 1.5 to 15% by weight, in particular from 2.5 to 7.5% by weight, of at least one cyclic phenoxyphosphazene having at least three phenoxyphosphazene units are used as component B. Appropriate phenoxyphosphazenes are described by way of example in paragraphs [0051] to in US 2010/0261818. Reference can in particular be made to the formula (I). Appropriate cyclic phenoxyphosphazenes are also described in EP-A-2 100 919 and in particular in paragraphs [0034] to [0038] of that document. They can be produced as described in paragraph [0041] of EP-A-2 100 919. In one embodiment of the invention, the phenyl groups in the cyclic phenoxyphosphazene can have been replaced by $C_{1-4}$-alkyl moieties. It is preferable that unsubstituted phenyl moieties are involved. For a further description of the cyclic phosphazenes reference can be made to Römpp Chemie-Lexikon [Römpp's chemical encyclopedia], 9th edn., keyword "Phosphazene" [Phosphazenes]. The production process proceeds by way of example through cyclophosphazene, which is obtainable from $PCl_5$ and $NH_4Cl$, where reaction with phenol is used to replace the chlorine groups in the cyclophosphazene by phenoxy groups.

The cyclic phenoxyphosphazene compound can by way of example be produced as described in "Phosphorus-Nitrogen Compounds" (Academic Press, 1972), H. R. Allcock and "Inorganic Polymers" (Prentice Hall International, Inc., 1992), J. E. Mark, H. R. Allcock and R. West.

Component B is preferably a mixture made of cyclic phenoxyphosphazenes having three and four phenoxyphosphazene units. The ratio by weight here of rings comprising three phenoxyphosphazene units to rings comprising four phenoxyphosphazene units is preferably about 80:20. Larger rings of the phenoxyphosphazene units can likewise be present, but in small amounts. Suitable cyclic phenoxyphosphazenes are obtainable from Fushimi Pharmaceutical Co., Ltd., as Rabitle® FP-100. This is a matt-white/yellowish solid with melting point 110° C., phosphorus content 13.4%, and nitrogen content 6.0%. The proportion of rings having three phenoxyphosphazene units is at least 80% by weight.

Component C
From 1 to 15% by weight, preferably from 3 to 9% by weight, in particular from 5 to 7% by weight, specifically about 6.5% by weight, of red phosphorus are used as component C. For a description of the red phosphorus, reference may be made to Holleman Wiberg, Lehrbuch der anorganischen Chemie [Textbook of inorganic chemistry], 1985, p. 624, section 2.1.3.4. The form in which the red phosphorus is added to the molding compositions of the invention can be that of powder or that of a masterbatch, preferably in polyamide. The density of the red phosphorus is about 2.2 $g/cm^3$.

Component D
From 0.1 to 20% by weight, preferably from 1 to 10% by weight, in particular from 3 to 8% by weight, for example about 6% by weight, of at least one impact-modifying polymer are used as component D. These involve impact-modifying polymers which are typically used to render the polyamides of component A impact-resistant. They preferably involve an elastomer, for example natural or synthetic rubbers or other elastomers.

Synthetic rubbers that may be mentioned as useful are ethylene-propylene-diene rubber (EPDM), styrene-butadiene rubber (SBR), butadiene rubber (BR), nitrile rubber (NBR), hydrin rubber (ECO), and acrylate rubbers (ASA). Silicone rubbers, polyoxyalkylene rubbers, and other rubbers are also useful.

Thermoplastic elastomers that may be mentioned are thermoplastic polyurethane (TPU), styrene-butadiene-styrene block copolymers (SBS), styrene-isoprene-styrene block copolymers (SIS), styrene-ethylene-butylene-styrene block copolymers (SEBS), and styrene-ethylene-propylene-styrene block copolymers (SEPS).

It is also possible to use resins in the form of blend polymers, examples being urethane resins, acrylic resins, fluoro resins, silicone resins, imide resins, amidimide resins, epoxy resins, urea resins, alkyd resins, and melamine resin.

It is also possible to use ethylene copolymers in the form of blend polymer, for example copolymers made of ethylene and 1-octene, 1-butene, or propylene, as described in WO 2008/074687. The molar masses of these ethylene-α-olefin copolymers are preferably in the range from 10 000 to 500 000 g/mol, with preference from 15 000 to 400 000 g/mol (number-average molar mass). It is also possible to use homopolyolefins, such as polyethylene or polypropylene.

Reference can be made to EP-B-1 984 438, DE-A-10 2006 045 869 and EP-A-2 223 904 for suitable polyurethanes.

Paragraph [0028] of JP-A-2009-155436 lists other suitable thermoplastic resins.

Other polymers suitable as component D are mentioned in paragraph [0044] in EP-A-2 100 919.

It is particularly preferable to use copolymers of ethylene and acrylates, acrylic acid, and/or maleic anhydride as component D. It is particularly preferable to use copolymers of ethylene, n-butyl acrylate, acrylic acid, and maleic anhydride. An appropriate copolymer is obtainable as Lupolen® KR1270 from BASF SE.

Component E

The thermoplastic molding compositions comprise from 0 to 50% by weight of glass fibers as component E, and if glass fibers are present the amount is from 1 to 50% by weight, preferably from 10 to 35% by weight, in particular from 20 to 30% by weight, for example about 25% by weight. Any desired suitable glass fibers can be used here in the form of chopped glass or in the form of rovings. The diameter of the chopped glass fibers is preferably about 10 μm. The glass fibers can have been surface-treated, for example silanized.

Component F

The thermoplastic molding compositions of the invention can comprise from 0 to 30% by weight of further additives, as component F. These additives can involve other fillers, stabilizers, oxidation retarders, agents that counteract decomposition by heat and decomposition by ultraviolet light, flame retardants, lubricants and mold-release agents, colorants, such as dyes and pigments, nucleating agents, plasticizers, etc. For a more detailed description of possible additives reference can be made to pages 31 to 37 of WO 2008/074687.

The amount of component F present is preferably from 0.1 to 20% by weight, where component F comprises stabilizers and lubricants. By way of example, zinc oxide can be used as stabilizer and calcium stearate can be used as lubricant. Conventional antioxidants for polyamide molding compositions can be used, for example the antioxidants marketed with trademark Irganox®.

Other fillers that can be used are carbon fibers, aromatic polyimide fibers, and other fillers such as gypsum fibers, synthetic calcium silicates, kaolin, calcined kaolin, wollastonite, talc, and chalk.

It is also possible to use other flame retardants as additives of component F concomitantly alongside the flame retardants of components B and C, examples being those based on triazines, on metal hydrates, and on silicones. A typical flame-retardant substance based on triazines is melamine cyanurate.

Other flame-retardant additive substances can be metal compounds, such as magnesium hydroxide, aluminum hydroxide, zinc sulfate, iron oxide, boron oxide, and metal borate, see also EP-A-2 100 919, paragraphs [0046] to [0048].

Examples of additional flame retardants are (di)phosphinate salts, other phosphazene compounds, and reaction products of melamine with phosphoric acid. A conventional reaction product of melamine with phosphoric acid is melamine polyphosphate. Suitable melamine polyphosphates, (di)phosphinate salts, and phosphinate salts are described by way of example in paragraphs [0023] to [0031] of EP-A-2 100 919.

Other synergistic flame-retardant substances are described by way of example in paragraphs [0064] and [0065] of US 2010/0261818.

In one embodiment of the invention, no other flame retardants are used alongside components B and C.

The molding compositions of the invention are produced via mixing of components A to F. It is advantageous to use extruders for this purpose, examples being single-screw or twin-screw extruders, or to use other conventional plastifying devices, such as Brabender mixers or Banbury mixers.

The sequence of mixing of the individual components here can be selected freely. It is preferable to use component C in the form of polyamide-containing masterbatch.

The molding compositions of the invention feature a significant reduction in flame times at specimen thicknesses of 0.4 mm and 0.8 mm. They are suitable for producing moldings, fibers, or foils.

The invention also provides corresponding moldings, fibers, or foils made of the thermoplastic molding composition described above.

The examples below provide further explanation of the invention.

EXAMPLES

The following components were used in the compositions of the invention:
Component A: nylon-6,6 (Ultramid®A24 from BASF SE)
Component B: cyclophosphazene (Rabitle® FB 110 from Fushimi Co.)
Component C: 40% red phosphorus in nylon-6,6 masterbatch (Masteret-21440 from Italmatch)
Component D: ethylene/n-butyl acrylate/acrylic acid/maleic anhydride copolymer (Lupolen® KR 1270 from BASF SE)
Component E: glass fibers (OCF 1110 with average diameter 10 μm)
Component F: stabilizer/lubricant: 50% zinc oxide, 25% calcium stearate, 25% Irganox® 98 anitoxidant
Lubricant: 50% stearyl stearate, 25% zinc stearate, 25% calcium stearate Table 1 below collates the constitutions of the comparative molding composition comp1, which comprises no cyclophosphazene, and of the inventive molding compositions of inventive examples 2, 3 and 4.

TABLE 1

| Example | comp1 [%] | 2 [%] | 3 [%] | 4 [%] |
| --- | --- | --- | --- | --- |
| Ultramid A24E | 50.21 | 47.71 | 45.21 | 42.71 |
| GF OCF 1110 | 26.00 | 26.00 | 26.00 | 26.00 |
| Masteret-21440, Italmatch | 16.25 | 16.25 | 16.25 | 16.25 |
| Lupolen KR 1270 | 6.00 | 6.00 | 6.00 | 6.00 |
| Ultrabatch 190X, Great Lakes | 1.40 | 1.40 | 1.40 | 1.40 |
| Ultrabatch 170 | 0.14 | 0.14 | 0.14 | 0.14 |
| FP-110 cyclophosphazene | | 2.50 | 5.00 | 7.50 |

The compounding process used a ZSK25 F41 extruder with screw speed 370 min$^{-1}$, throughput 28 kg/h, with an applied pressure of 200 mbar abs. The extruder was operated at a temperature of 280° C.

Test specimens for UL 94 combustion tests were produced as described in EP-A-2 100 919. Moldings were produced with thickness 0.4 mm and 0.8 mm.

The mechanical properties of the moldings were determined to the following standards:
Tensile modulus of elasticity tested to DIN EN ISO 527-1/-2
Tensile stress at break tested at 5 mm/min to DIN EN ISO 527-1/-2
Tensile strain at break tested at 5 mm/min to DIN EN ISO 527-1/-2
Charpy impact resistance tested at 23° C. to DIN EN ISO 179

Table 2 below collates the results of the mechanical studies and of the combustion tests. The two different thicknesses, 0.4 mm and 0.8 mm, here were subjected to combustion tests at 2d, 23° C., and 7d, 70° C. Table 2 below collates the results.

TABLE 2

| | | | | |
|---|---|---|---|---|
| Injection pressure, UL 94, 0.4 mm [bar] | 807.5 | 807.5 | 779.3 | 656.2 |
| Modulus of elasticity [MPa] | 8453 | 8218 | 8003 | / |
| Tensile stress at break (ó_B) [MPa] | 134.9 | 127.0 | 123.2 | / |
| Tensile strain at break (ε_B) [MPa] | 3.2 | 3.3 | 3.0 | / |
| Charpy without notch, 23° C. [kJ/m$^2$] | 67 | 64.4 | 63.3 | / |
| UL 94, 0.4 mm (2 d, 23° C.) | comp1 | 2 | 3 | 4 |
| Drops without ignition | | | | |
| Total afterflame time | 24.1 | 19.4 | 16.8 | 12.2 |
| Ignition of cotton pad under specimen | 3 | 6 | 4 | 4 |
| Afterflame time >30 sec. | 0 | 0 | 0 | 0 |
| UL 94 classification | V2 | V2 | V2 | V2 |
| UL 94, 0.4 mm (7 d, 70° C.) | comp1 | 2 | 3 | 4 |
| Drops without ignition | 5 | 7 | 10 | 1 |
| Total afterflame time | 16.0 | 15.2 | 12.4 | 19.0 |
| Ignition of cotton pad under specimen | V1 | 0 | 0 | 4 |
| Afterflame time >30 sec. | 0 | 0 | 0 | 0 |
| UL 94 classification | V2 | V0 | V0 | V2 |
| Injection pressure, UL 94, 0.8 mm [bar] | 713.8 | 677.7 | 452.9 | 405.5 |
| UL 94, 0.8 mm (2 d, 23° C.) | comp1 | 2 | 3 | 4 |
| Drops without ignition | 5 | 7 | 10 | 1 |
| Total afterflame time | 30.9 | 26.3 | 18.6 | 14.6 |
| Ignition of cotton pad under specimen | 0 | 0 | 0 | 0 |
| Afterflame time >30 sec. | 0 | 0 | 0 | 0 |
| UL 94 classification | V0 | V0 | V0 | V0 |
| UL 94, 0.8 mm (7 d, 70° C.) | 1 | 2 | 3 | 4 |
| Drops without ignition | 2 | 3 | 0 | 0 |
| Total afterflame time | 65.3 | 17.0 | 13.0 | 19.7 |
| Ignition of cotton pad under specimen | 0 | 0 | 0 | 0 |
| Afterflame time >30 sec. | 0 | 0 | 0 | 0 |
| UL 94 classification | V0 | V0 | V0 | V0 |

As is apparent from the total afterflame time results, the combination of cyclic phenoxy-phosphazenes with red phosphorus can significantly reduce total afterflame time.

The invention claimed is:

1. A thermoplastic molding composition comprising
    a) from 30 to 95% by weight of at least one aliphatic polyamide or copolyamide, as component A,
    b) from 1 to 30% by weight of at least one cyclic phenoxyphosphazene having at least 3 phenoxyphosphazene units, as component B,
    c) from 1 to 15% by weight of red phosphorus, as component C,
    d) from 0.1 to 20% by weight of at least one impact-modifying polymer, as component D, wherein as component D, a copolymer of ethylene with acrylates, acrylic acid, and maleic anhydride is used
    e) from 0 to 50% by weight of glass fibers, as component E, and
    f) from 0 to 30% by weight of further additives, as component F,
where the total amount of components A to F does not exceed 100% by weight.

2. The thermoplastic molding composition according to claim 1, wherein component A is nylon-6, nylon-6,6, or a copolyamide or blend thereof.

3. The thermoplastic molding composition according to claim 1, wherein component B is a mixture made of cyclic phenoxyphosphazenes having 3 and 4 phenoxyphosphazene units.

4. The thermoplastic molding composition according to claim 2, wherein component B is a mixture made of cyclic phenoxyphosphazenes having 3 and 4 phenoxyphosphazene units.

5. The thermoplastic molding composition according to claim 1, wherein from 5 to 50% by weight of glass fibers are present, as component E.

6. The thermoplastic molding composition according to claim 4, wherein from 5 to 50% by weight of glass fibers are present, as component E.

7. The thermoplastic molding composition according to claim 1, wherein from 0.1 to 20% by weight of component F are present, where component F comprises stabilizers and lubricants.

8. The thermoplastic molding composition according to claim 6, wherein from 0.1 to 20% by weight of component F are present, where component F comprises stabilizers and lubricants.

9. A process for producing thermoplastic molding compositions according to claim 1 which comprises mixing of components A to F.

10. The process according to claim 9, wherein component C is used in the form of polyamide-containing masterbatch.

11. A molding, fiber, or foil made of the thermoplastic molding composition according to claim 1.

12. A process for producing thermoplastic molding compositions according to claim 1 which comprises mixing of components A to D.

13. The thermoplastic molding composition according to claim 1, wherein component E is present in an amount from 1 to 50% by weight.

14. The thermoplastic molding composition according to claim 1, wherein component E is present in an amount from 10 to 35% by weight.

15. The thermoplastic molding composition according to claim 1, wherein component E is present in an amount from 20 to 35% by weight.

16. The thermoplastic molding composition according to claim 8, wherein component E is present in an amount from 20 to 35% by weight.

17. A molding, fiber, or foil made of the thermoplastic molding composition according to claim 16.

18. The thermoplastic molding composition according to claim 1, wherein
from 45% to 84.5% by weight is component A
from 1.5% to 15% by weight is component B,
from 3% to 9% by weight is component C
from 1to 10% by weight is component D,
from 10 to 35% by weight is component E and
from 0.1 to 20% by weight of component F.

19. The thermoplastic molding composition according to claim 18, wherein
from 55% to 69.5% by weight is component A
from 2.5% to 7.5% by weight is component B,
from 5 to 7% by weight is component C
from 3% to 8% by weight is component D, from 20 to 30% by weight is component E and the diameter of the glass fibers is about 10 μm.

20. The thermoplastic molding composition according to claim 16, wherein component A is nylon-6,6 and component D is ethylene/n-butyl acrylate/acrylic acid/maleic anhydride copolymer.

* * * * *